United States Patent [19]

Onogi et al.

[11] Patent Number: 4,749,239
[45] Date of Patent: Jun. 7, 1988

[54] HYDRAULIC PRESSURE CONTROL SYSTEM FOR MOTOR VEHICLES

[75] Inventors: Nobuyoshi Onogi; Mamoru Shimamoto, both of Nagoya; Yoshiaki Hoashi, Kariya; Masakazu Tago, Aichi; Yoshihisa Nomura, Toyota, all of Japan

[73] Assignees: Nippondenso Co., Ltd., Kariya; Toyota Jidosha Kabushiki Kaisha, Toyota, both of Japan

[21] Appl. No.: 9,160

[22] Filed: Jan. 30, 1987

[30] Foreign Application Priority Data

Jan. 31, 1986 [JP] Japan .................... 61-20353

[51] Int. Cl.$^4$ .............. B60T 8/78; B60T 8/58; B60T 8/70
[52] U.S. Cl. .................... 303/95; 303/100; 303/105; 303/109; 364/426
[58] Field of Search ............ 188/181 C; 364/426; 303/20, 93, 95, 97, 100, 103, 105, 106, 108, 109, 113, DIG. 3, DIG. 4; 60/602

[56] References Cited

U.S. PATENT DOCUMENTS

| | | | |
|---|---|---|---|
| 3,637,264 | 1/1972 | Leiber et al. ........... | 303/20 |
| 3,953,083 | 4/1976 | Latvald et al. ......... | 303/103 |
| 4,225,195 | 9/1980 | Weise et al. ........... | 303/103 X |
| 4,395,761 | 7/1983 | Sato et al. ............. | 303/106 X |
| 4,660,382 | 4/1987 | Ueno et al. ............ | 60/602 |
| 4,660,896 | 4/1987 | Matsuda ................ | 303/106 |

FOREIGN PATENT DOCUMENTS 2134200 8/1984 United Kingdom.
2147963 5/1985 United Kingdom.

Primary Examiner—Andres Kashnikow
Assistant Examiner—Timothy Newholm
Attorney, Agent, or Firm—Cushman, Darby & Cushman

[57] ABSTRACT

Disclosed is a hydraulic pressure control system for a motor vehicle which may be employed for anti-skid control. The control system comprises a wheel braking device for providing the brake for a wheel of the vehicle under hydraulic pressure, a braking pressure switching device for performing the switching operation at least between the increasing and decreasing of the hydraulic pressure applied to the wheel braking device, and a hydraulic pressure control unit for supplying a control signal to the braking pressure switching device at a predetermined interval so that the hydraulic pressure value to be applied to the wheel braking device becomes equal to a target hydraulic pressure value. The control unit compares the target hydraulic pressure value with first and second reference values which are obtained on the basis of an estimated hydraulic pressure value estimated to apply the wheel braking device and producing the control signal in accordance with the results of the comparison.

17 Claims, 6 Drawing Sheets

HYDRAULIC PRESSURE CONTROL SYSTEM FOR MOTOR VEHICLES

BACKGROUND OF THE INVENTION

The present invention relates generally to hydraulic pressure control, more particularly to a hydraulic braking pressure control system for motor vehicles. The present invention may be embodied, for example, in an anti-skid control system, but it will be appreciated that it is also useful in other applications such as a vehicle height control system.

Various types of anti-skid control systems for motor vehicles have been developed to control the speed of each of the wheels of a motor vehicle. The purpose is to prevent a decrease in vehicle safety due to locking of the wheels on vehicle braking operation. One known arrangement is disclosed in Japanese Patent Publication No. 51-6308, in which the control of hydraulic braking pressure is performed by changing the pressure-increasing and pressure-decreasing proportions in accordance with a control of the duty ratio of an output signal to a hydraulic pressure adjusting device.

Although such a prior art technique provides satisfactory results for meeting the requirements imposed in anti-skid control, it would be advantageous from the viewpoint of more effectively performing the hydraulic pressure control to provide a new hydraulic pressure control system for a motor vehicle.

SUMMARY OF THE INVENTION

It is therefore an object of the present invention to provide a new hydraulic pressure control system for motor vehicles.

In accordance with the present invention, there is provided a hydraulic pressure control system for a motor vehicle, comprising: wheel braking means for providing the brake for a wheel of the vehicle under hydraulic pressure; braking pressure switching means for performing the switching operation at least between the increasing and decreasing of the hydraulic pressure applied to the wheel braking means; and hydraulic pressure control means for supplying a control signal to said braking pressure switching means at a predetermined interval so that the hydraulic pressure value to be applied to said wheel braking means becomes equal to a target hydraulic pressure value.

A feature of the present invention is that the control means includes means for comparing the target hydraulic pressure value with first and second reference values which being obtained on the basis of an estimated hydraulic pressure value estimated to apply the wheel braking means and producing said control signal in accordance with the results of the comparison.

A further feature of this invention is that the control means further includes means for correcting the duty ratio of the control signal at a second predetermined interval after the duty ratio thereof is determined at the first-mentioned predetermined interval, the duty ratio being corrected by amount proportional to the number of times of elapse of the second predetermined interval.

BRIEF DESCRIPTION OF THE DRAWINGS

The object and features of the present invention will become more readily apparent from the following detailed description of the preferred embodiments taken in conjuction with the accompanying drawings in which.

DETAILED DESCRIPTION OF THE INVENTION

Figure 1:
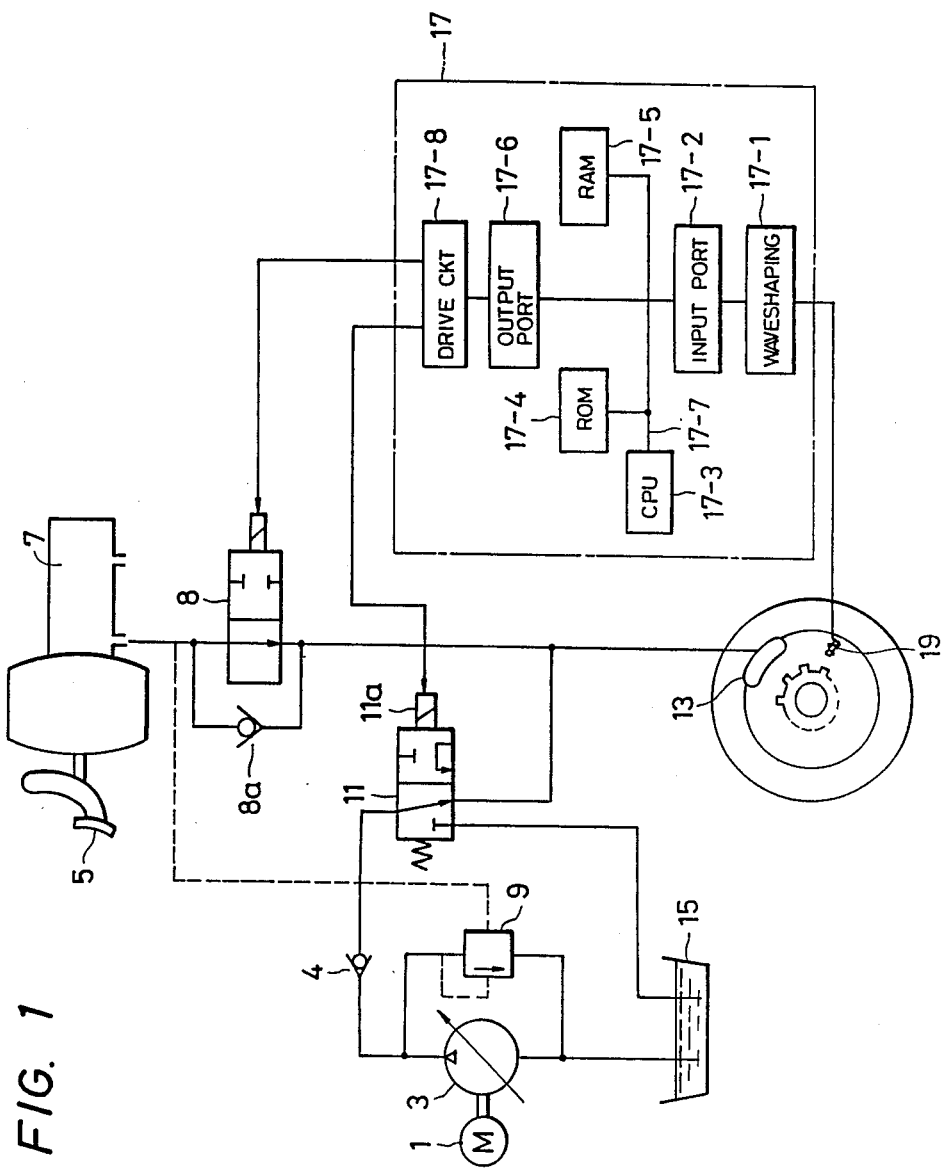
FIG. 1 is a schematic diagram showing a hydraulic pressure control system according to a first embodiment of the present invention.

Referring now to FIG. 1, there is schematically illustrated a hydraulic pressure control system according to an embodiment of the present invention.

In FIG. 1, between a suction opening and a discharging opening of a hydraulic pressure pump 3 driven by a motor 1 is provided a directional control valve 9 for cutting off the communication therebetween and for maintaining the cutoff state by the hydraulic pressure from a braking master cylinder 7 in response to stepping operation of a braking pedal 5, thereby enabling the follow-up of the pressure of the hydraulic presure pump 3 to the pressure in the master cylinder 7. The discharging opening of the hydraulic pressure pump 3 is coupled through a check valve 4 and a three-port two-position solenoid valve 11 to a wheel cylinder 13. Between the wheel cylinder 13 and the master cylinder 7 there is provided a cutting-off valve 8 and a returning check valve 8a. The two-position solenoid valve 11 is arranged to maintain the communicating state between the discharging opening of the hydraulic pressure pump 3 and the wheel cylinder 13 during deenergization and, on the other hand, to maintain the communicating state between the wheel cylinder 13 and a reservoir 15 during energization. The switching operations of the cutting-off valve 8 and two-position solenoid valve 11 are respectively controlled in accordance with control signals from an electronic control circuit 17.

To the electronic control circuit 17 there is electrically coupled a rotational sensor 19 comprising an electromagnetic pick-up device for generating a voltage pulse signal with a frequency corresponding to the rotational speed of a wheel.

The electronic control circuit 17 is provided with a waveform shaping circuit 17-1 for performing the waveform-shaping of the voltage pulse signal generated by the rotational sensor 19, and further provided with a microcomputer including an input port 17-2 for inputting the signal waveshaped by the waveshaping circuit 17-1, a central processing unit (CPU) 17-3, a read-only memory (ROM) 17-4, a random access memory (RAM) 17-5, an output port 17-6 for outputting a signal indicative of the results of process performed by the CPU 17-3, a common bus 17-7 for connection between the above-mentioned units, and so on. Also included in the electronic control circuit 17 is a drive circuit 17-8 for supplying an exciting current to an exciting coil 11a of the two-position solenoid valve 11 and an exciting coil of the cutting-off valve 8 in accordance with the output of the output port 17-6.

Figure 2:
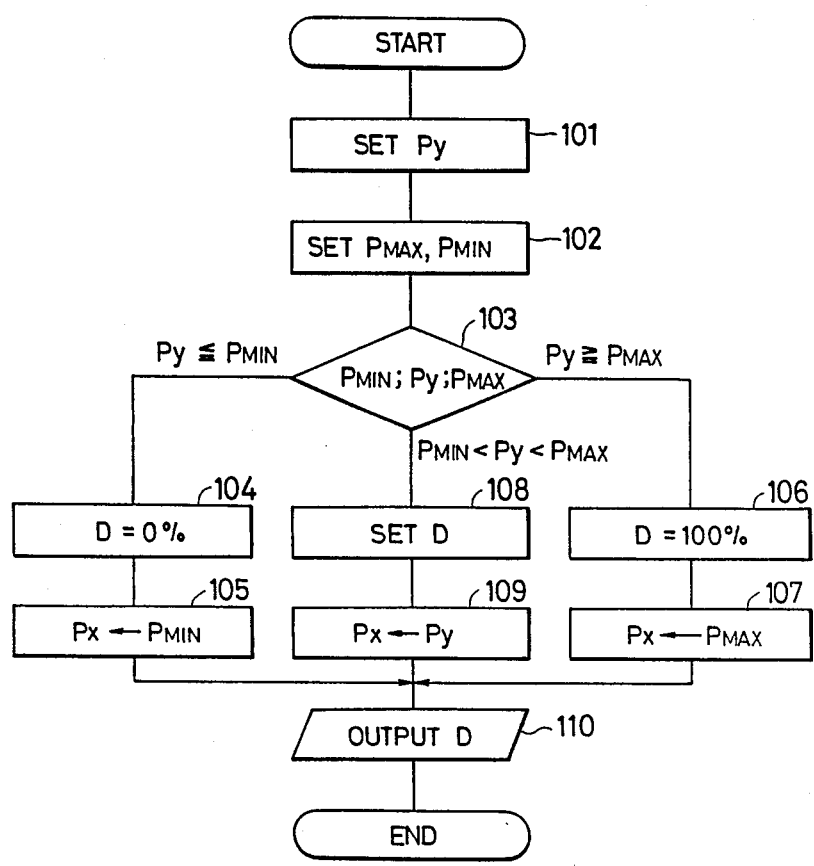
FIG. 2 is a flow chart for describing the programmed steps of a microcomputer according to the first embodiment.

The electronic control circuit 17 performs anti-skid control on the basis of a signal from the rotational sensor 19 provided on the wheel in a response to braking operation due to pressing of the braking pedal 5. The cutting-off valve 8 is energized to be set to the cutoff state to effect the anti-skid. Thereafter, an interrupt routine shown in the flow chart of FIG. 2 is executed at a predetermined interval, for example, at an interval of 32 ms. The processes performed during one cycle every 32 ms, will be described hereinbelow. Although the description is made in terms of one wheel of a motor vehicle, the processes will be performed for all of the wheels.

The interrupt routine begins with a step 101 to set a target hydraulic pressure value Py to the wheel cylinder 13. The target hydraulic pressure Py is determined as follows on the basis of the voltage pulse signal from the rotational speed sensor 19 and constants prestored in the ROM 17-4.

Assuming that the vehicle speed is $V_B$ and the wheel speed is $V_W$, the target hydraulic pressure value Py is obtained in accordance with the following equation (3) using parameters $W_P$ and $P_{MED}$ respectively obtained by the following equations (1) and (2). The parameter $W_P$ is obtained on the basis of the voltage pulse signal from the rotational speed sensor 19 and the parameter $P_{MED}$ is obtained using the obtained parameter $W_P$.

$$W_p = k1 \times (V_W - V_B + k2) + k3 \times (\dot{V}_W - \dot{V}_B) \quad (1)$$

$$P_{MED} \leftarrow P_{MED} + k4 \times W_P \quad (2)$$

$$P_y \leftarrow P_{MED} + k5 \times W_P \quad (3)$$

where k1, k2, k3, k4, k5 are constants and $\dot{V}_W$ is an acceleration value of the wheel and $\dot{V}_B$ is an acceleration value of the vehicle, and $P_{MED}$ is initially set to a predetermined value and is varied in accordance with the control.

Here, the vehicle speed $V_B$ will be estimated on the basis of the wheel speed $V_W$ or obtained directly using a vehicle speed sensor or the like.

Secondly, the maximum hydraulic pressure value Pmax and the minimum hydraulic pressure value Pmin are set in accordance with an estimation value Px of hydraulic pressure presently applied to the wheel cylinder 13 (step 102). For example, Px is initially estimated to be 160 kg.weight/cm². Pmax is an estimated hydraulic pressure which is expected at the time of termination of one cycle, 32 ms, when a command signal with duty ratio of 100%, i.e., a signal indicative of only pressure-increasing, is outputted to the two-position solenoid valve 11, and Pmin is an estimated hydraulic pressure value which is expected at the time of termination of a cycle when a command signal with duty ratio of 0%, i.e., a signal representative of only pressure-decreasing is outputted to the two-position solenoid valve 11. Pmax and Pmin are respectively used as references for hydraulic pressure control.

In a subsequent step 103, the target hydraulic pressure value Py is compared with Pmax and Pmin. If Py ≦ Pmin, the duty ratio D of the command signal is set to 0% (step 104) and Pmin is set to Px, the target hydraulic pressure value (step 105). On the other hand, if Py ≧ Pmax, the duty ratio D of a command signal is set to 100% (step 106) and Pmax is set to Px (step 107).

Figure 3:
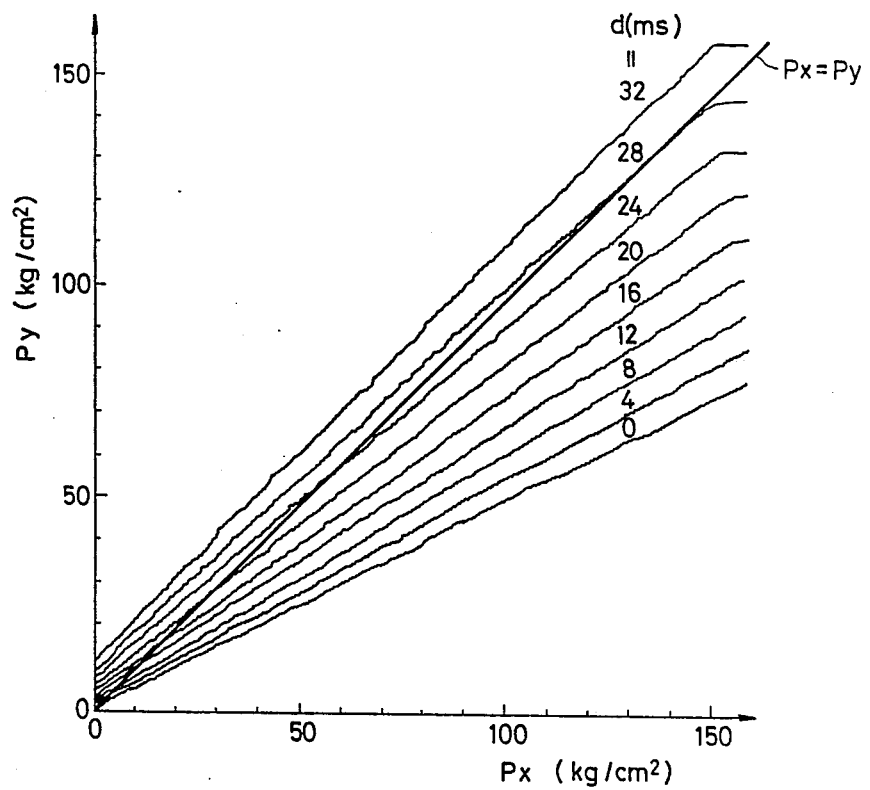
FIG. 3 is a diagrammatic view showing the relation between the target hydraulic pressure values and the estimated hydraulic pressure values.

If Pmin < Py < Pmax, the duty ratio D is determined in accordance with a map (FIG. 3) which represents the relation between Px and Py (interpolation is additionally performed if required) (step 108), and Py set in the step 101 is set to Px (step 109). Here, the equation used in place of the map is as follows.

$$P_y = (P_x + 0.344d) \times 0.5 e^{0.0217d}$$

where d is a parameter representing the pressure-increasing time in one cycle of 32 ms.

An exciting current pulse with the duty ratio set in the step 104, 106 or 108 is outputted to the two-position solenoid valve 11 (step 110).

Figure 4:
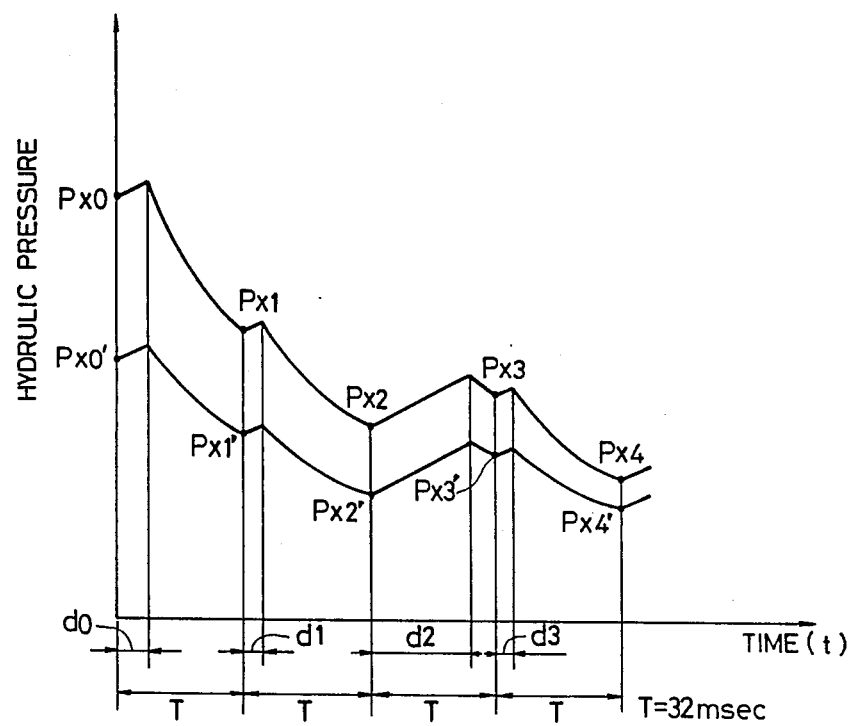
FIG. 4 is a diagrammatic view showing one example of the relation between the hydraulic pressure variation in control and the actual hydraulic pressure variation.

With above-mentioned processes, as shown in FIG. 4, even if the hydraulic presure to the wheel cylinder 13 is actually Pxo' at the time of start of control and the initial value used in the control is Pxo, since the duty ratio D is set one by one and an exciting current pulse with the set duty ratio D is outputted, the hydraulic pressure in the control approaches an actual hydraulic pressure with the passage of time.

A further embodiment of the present invention will be described hereinbelow with reference to flow charts of FIGS. 5 and 6. In this second embodiment, when the duty ratio of an exciting current pulse applied to the two-position solenoid valve 11 is adjusted, the adjustment is performed at intervals of 32 ms and the duty ratio is corrected in an interrupt process performed at intervals of 8 ms, thereby enabling more accurate control.

Figure 5:
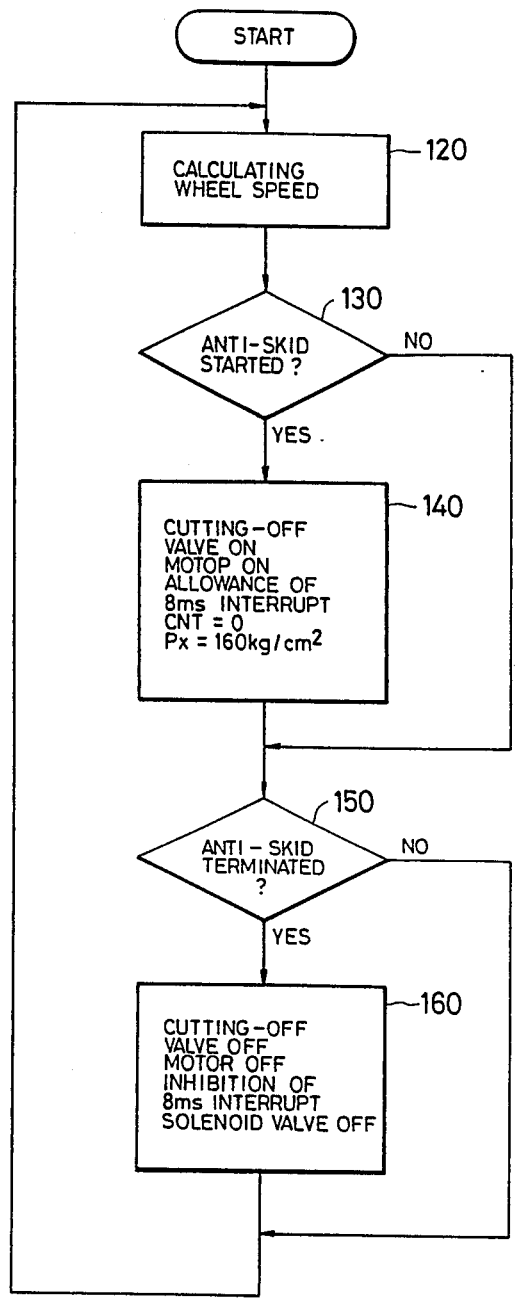
FIG. 5 is a flow chart illustrating the main routine performed in a second embodiment of the present invention.

Normally, as shown in the main routine of FIG. 5, the speed of each of wheels of the vehicle is calculated in a wheel speed calculating step 120, and prior to the braking operation the operational flow returns through a control-starting decision step 130 and an anti-skid termination decision step 150 to the step 120.

Figure 6:
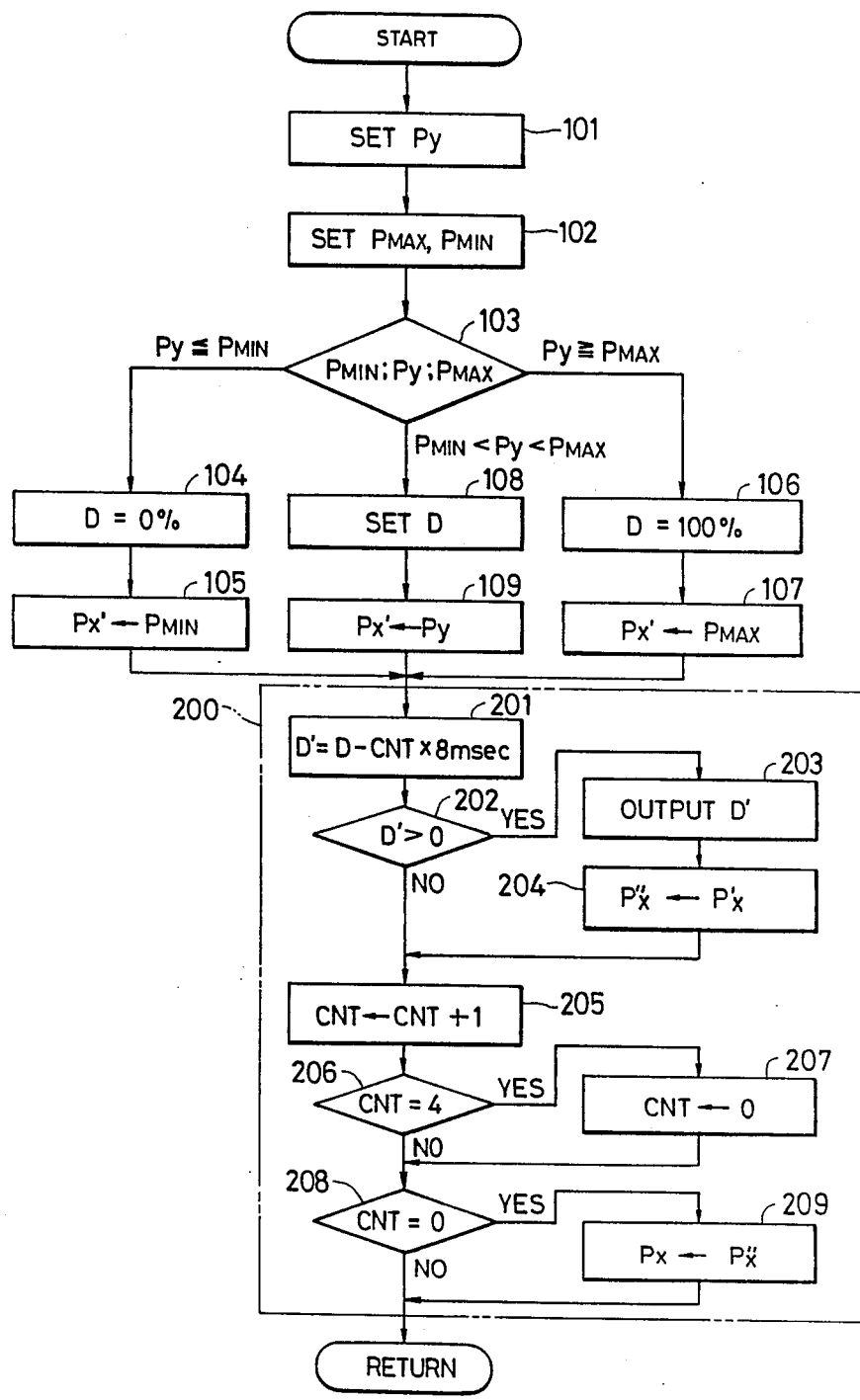
FIG. 6 is a flow chart illustrating the interrupt routine performed in the second embodiment.

When the wheel speed is rapidly decreased in response to the braking operation and the condition of the anti-skid control is satisfied, control goes to a step 140 in which the cutting-off valve 8 and the motor 1 are respectively turned on, the 8-ms interruption is allowed, a counter CNT is reset to zero and Px is set to 160 kg.weight/cm², whereby an interrupt routine shown in FIG. 6 is executed. The interrupt routine of FIG. 6 is substantially similar to the FIG. 2 interrupt routine with exception that it includes a correction block 200 comprising steps 201 to 209. The FIG. 6 interupt routine is executed at intervals of 8 ms.

On the other hand, when the condition of the anti-skid control termination is satisfied in response to the termination of the braking operation, the decision at the step 150 turns from "NO" to "YES", and a step 160 is executed to deenergize the cutting-off valve 8, the motor 1 and the two-position solenoid valve 11 and to inhibit the interruption so that all the control is completed.

In steps 101 to 109 of the FIG. 6 interrupt routine, as well as in the FIG. 2 interrupt routine, a timer data D corresponding to duty ratio is determined, and then the timer data D, i.e., duty ratio, is corrected in the correction block 200. When the operational flow initially enters in this correction block 200, the counter CNT is zero, and therefore the timer data Dt is not corrected in the step 201 and the operational flow returns through the steps 202, 205, 206 and 208 to the main routine of FIG. 5. In this case, the counter CNT is incremented by one in the step 205.

In response to the passage of 8 ms, the step 201 is executed to obtain a corrected timer data D' by subtracting 8 ms from the timer data D, that is, obtain D' as D'=D−count value (in this case, 1)×8 ms, and the corrected timer data D' is outputted in the step 203 so that the duty ratio is corrected in accordance with the corrected timer data D' when it is determined in the step 202 that D' is greater than zero and then the operational flow returns through the steps 204, 205, 206, 208 to the main routine of FIG. 5. In the step 204, Px' is set to Px".

Thereafter, at every elapse of 8 ms, the above-mentioned processes are repeatedly executed until the corrected timer data becomes zero, and when the count value of the counter CNT reaches 4 (32 ms) in the step 206, the counter CNT is reset to zero in the step 207 and control advances from the step 208 to the step 209 wherein Px" is set to Px so that the correction of the duty ratio in unit of one cycle, 32 ms, is terminated. This correction process is repeatedly performed at intervals of 32 ms, thereby enabling more accurate control in accordance with the state variation at intervals of 8 ms.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A hydraulic pressure control system for a motor vehicle, comprising:
   wheel braking means for braking a wheel of said vehicle responsive to an applied hydraulic pressure;
   braking pressure switching means for switching at least between an increasing and a decreasing of said hydraulic pressure applied to said wheel braking means, said braking pressure switching means including a valve with two positions, the hydraulic pressure increasing with the valve in one position and decreasing with the valve in another position; and
   hydraulic pressure control means for producing a control signal and supplying said control signal to said braking pressure switching means at a predetermined interval to increase and decrease said applied hydraulic pressure, to cause the hydraulic pressure value applied to said wheel braking means to approach a target hydraulic pressure value, said control means including:
   means for determining a target hydraulic pressure based on system conditions;
   means for estimating an estimated hydraulic pressure value which is currently being applied to said wheel braking means, and obtaining first and second reference values based on said estimated value;
   means for comparing said target hydraulic pressure value with said first and second reference values and producing said control signal in accordance with the results of the comparison, including duty cycle control means for setting a duty cycle of said control signal as a duty ratio which is predetermined on the basis of said target hydraulic pressure value and said estimated hydraulic pressure value.

2. A hydraulic pressure control system as claimed in claim 1, further comprising a rotational speed sensor coupled to said wheel, wherein said target hydraulic pressure value is determined on the basis of a signal from said rotational speed sensor.

3. A hydraulic pressure control system as claimed in claim 1, wherein said estimating means includes means for estimating said first and second reference values as values at the time of starting of a hydraulic pressure control cycle.

4. A hydraulic pressure control system as claimed in claim 1, wherein said duty cycle control means includes means for producing said control signal with a duty ratio of 0% when said target hydraulic pressure value is smaller than said first reference value.

5. A hydraulic pressure control system as claimed in claim 1, wherein said duty cycle control means includes means for producing said control signal with a duty ratio of 100% when said target hydraulic pressure value is greater than said second reference value.

6. A hydraulic pressure control system for a motor vehicle, comprising:
   wheel braking means for braking a wheel of said vehicle responsive to an applied hydraulic pressure;
   braking pressure switching means for switching at least between an increasing and a decreasing of said hydraulic pressure applied to said wheel braking means;
   hydraulic pressure control means for determining, at first predetermined interval, a control signal with a duty ratio to be supplied said braking pressure switching means so that the hydraulic pressure applied to said wheel braking means approaches a target hydraulic pressure value, said control means including means for estimating an estimated hydraulic pressure value to use as said applied hydraulic pressure, and obtaining first and second reference values based on said estimated hydraulic pressure value, means for comparing said target hydraulic pressure value with said first and second reference values and producing said control signal in accordance with the results of the comparison, and means for correcting said duty ratio of said control signal at a second predetermined interval after the duty ratio thereof is determined at said first predetermined interval, the duty ratio being corrected by an amount proportional to the number of times of elapse of said second predetermined interval.

7. A hydraulic pressure control system as claimed in claim 6, wherein said correcting means corrects the duty ratio by subtracting said amount from a value corresponding to the duty ratio.

8. A hydraulic pressure control system as claimed in claim 7, wherein said amount is obtained by multiplying the number of the times of elapse of said second predetermined interval by said second predetermined interval.

9. A hydraulic pressure control system as claimed in claim 1, further comprising means for storing a predetermined map between said estimated hydraulic pressure value, said target hydraulic pressure value and a duty ratio, wherein said control means determines the duty ratio of said control signal in accordance with said map.

10. A hydraulic pressure control system as claimed in claim 1, wherein the hydraulic pressure is linearly varied on increasing due to the duty ratio, and the hydraulic pressure is curvedly varied on decreasing due to the duty ratio.

11. A system as in claim 1 wherein said estimated hydraulic pressure value is initially estimated as a predetermined value.

12. A system as in claim 1 wherein said first reference value is a maximum pressure value indicative of an amount of pressure applied to said wheel braking means during a time of only pressure increasing at said estimated hydraulic pressure, and said second reference value is a minimum pressure value indicative of a pressure applied to said wheel braking means during a time of only pressure decreasing.

13. A hydraulic pressure control system for a motor vehicle comprising:
   braking means for braking a wheel of a vehicle responsive to an applied hydraulic pressure;
   braking pressure switching means for switching between an increasing of hydraulic pressure and a decreasing of hydraulic pressure applied to said wheel braking means; and
   control means for:
   a. setting a target pressure Py in accordance with system conditions;
   b. estimating an estimated hydraulic pressure as a predetermined amount at a time of hydraulic pressure control initiation;
   c. determining, based on said estimated hydraulic pressure, a first reference value indicative of a maximum pressure increase and a second reference value indicative of a maximum pressure decrease;
   d. comparing said target pressure with said first reference value and said second reference value;
   e. adjusting said estimated hydraulic pressure Px based on said comparison;
   f. determining a duty cycle of said braking pressure switching means based on said comparison;
   g. allowing a predetermined time interval to elapse; and
   h. repeating said steps (c)–(g) after every said predetermined interval of time elapses to cause said hydraulic pressure applied to said braking means to approach said target hydraulic pressure value.

14. A system as in claim 13 wherein said first reference value is a maximum pressure value indicative of an amount of pressure applied to said wheel braking means during a time of only pressure increasing at said estimated hydraulic pressure, and said second reference value is a minimum pressure value indicative of a pressure applied to said wheel braking means during a time of only pressure decreasing at said estimated hydraulic pressure.

15. A method for controlling hydraulic pressure for a motor vehicle brake which includes wheel braking means for braking a wheel of the vehicle responsive to an applied hydraulic pressure, and braking pressure switching means for switching between an increasing and a decreasing of the hydraulic pressure applied to the wheel braking means, comprising the steps of:
   a. setting a target hydraulic pressure $P_y$ in accordance with system conditions;
   b. estimating an estimated hydraulic pressure actually applied to a wheel of the vehicle;
   c. determining a first reference value indicative of a maximum hydraulic pressure applied to said wheel using said hydraulic pressure Px and a second reference value indicative of a minimum hydraulic pressure applied to said wheel using said hydraulic pressure Px;
   d. comparing said target hydraulic pressure with said first and second reference values;
   e. setting a duty cycle of said braking pressure switching means based on said comparison;
   f. allowing a predetermined time interval to elapse; and
   g. repeating said steps (c)–(f) after every said predetermined interval of time elapses.

16. A method as in claim 15 comprising the further step of updating said estimated hydraulic pressure Px based on said comparison.

17. A method as in claim 16 comprising the further step of estimating said estimated hydraulic pressure as a predetermined amount.

* * * * *